US011397091B2

(12) United States Patent
Singer et al.

(10) Patent No.: US 11,397,091 B2
(45) Date of Patent: Jul. 26, 2022

(54) VEHICLE ROUTE OPTIMIZATION

(71) Applicant: International Business Machines Corporation, Armonk, NY (US)

(72) Inventors: Noah Singer, White Plains, NY (US); Ryan Elsasser, Poughkeepsie, NY (US); Khaalid Persaud Juggan McMillan, Wappingers Falls, NY (US); Suraush Khambati, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 16/546,418

(22) Filed: Aug. 21, 2019

(65) Prior Publication Data
US 2021/0055118 A1  Feb. 25, 2021

(51) Int. Cl.
*G01C 21/34* (2006.01)
*G08G 1/00* (2006.01)

(52) U.S. Cl.
CPC ..... *G01C 21/3461* (2013.01); *G01C 21/3438* (2013.01); *G01C 21/3492* (2013.01); *G08G 1/202* (2013.01)

(58) Field of Classification Search
CPC ............... G08G 1/202; G01C 21/3461; G01C 21/3438; G01C 21/3492
See application file for complete search history.

(56) References Cited

U.S. PATENT DOCUMENTS

| 6,179,252 B1 | 1/2001 | Roop et al. |
| 6,243,027 B1 * | 6/2001 | Hill ........................ G08G 1/164 340/539.18 |

(Continued)

FOREIGN PATENT DOCUMENTS

| JP | 2006226767 A | 8/2006 |
| JP | 2010223708 A | 10/2010 |

OTHER PUBLICATIONS

Anonymous, "System for Intelligent Traffic Flow Based on Predictable Delays" ip.com—IPCOM000255638D, Oct. 1, 2018 (4 pages).

*Primary Examiner* — Aniss Chad
*Assistant Examiner* — Stephanie T Su
(74) *Attorney, Agent, or Firm* — Cantor Colburn LLP; Tihon Poltavets

(57) ABSTRACT

Aspects of the present disclosure provide a computer-implemented method that includes, responsive to receiving a pickup location request indicating a pickup location, identifying a vehicle in a vicinity associated with the pickup location, the vehicle having vehicle location data associated therewith. The method further includes selecting a shortest route from the vehicle to the pickup location. The method further includes, responsive to determining that a crossing is present along the shortest route, receiving target object location data for a target object associated with the crossing. The method further includes determining whether the target object and the vehicle intersect are predicted to intersect at the crossing. The method further includes, responsive to determining the target object and the vehicle are predicted to intersect at the crossing, identifying another vehicle in the vicinity, wherein the other vehicle traverses a route that avoids the crossing.

18 Claims, 9 Drawing Sheets

(56) References Cited

U.S. PATENT DOCUMENTS

| | | | |
|---|---|---|---|
| 7,400,972 B2 * | 7/2008 | Kozak | G01C 21/3461 |
| | | | 340/995.24 |
| 7,769,544 B2 | 8/2010 | Blesener et al. | |
| 8,297,558 B2 | 10/2012 | O'Dell et al. | |
| 9,227,642 B2 * | 1/2016 | Huntimer | B61L 25/025 |
| 9,841,287 B1 * | 12/2017 | Hayward | G01S 19/51 |
| 10,564,638 B1 * | 2/2020 | Lockwood | G05D 1/0044 |
| 2005/0267651 A1 | 12/2005 | Arango et al. | |
| 2019/0145791 A1 | 5/2019 | Rempel et al. | |
| 2019/0152450 A1 * | 5/2019 | Weber | G01C 21/3461 |
| 2019/0337543 A1 * | 11/2019 | Corbo | B61L 27/0077 |

* cited by examiner

VEHICLE ROUTE OPTIMIZATION

BACKGROUND

The present invention generally relates to vehicle route planning, and more specifically, to vehicle route optimization.

A vehicle, such as a car, truck, van, motorcycle, or similar, can travel along a route from an origin to a destination. In ride-sharing environments, a user requests a pickup at a particular pickup location. The vehicle travels along a route from its origin to a destination corresponding to the pickup location. A ride-sharing vehicle can be selected based on different criteria, such as how long it will take the vehicle to travel to the pickup location. In some situations, the vehicle can be delayed along its route.

SUMMARY

Embodiments of the present invention are directed to vehicle route optimization.

A non-limiting example computer-implemented method includes, responsive to receiving a pickup location request indicating a pickup location, identifying, by a processing device, a vehicle in a vicinity associated with the pickup location, the vehicle having vehicle location data associated therewith. The method further includes selecting a shortest route from the vehicle to the pickup location. The method further includes, responsive to determining that a crossing is present along the shortest route, receiving target object location data for a target object associated with the crossing. The method further includes determining, by the processing device, whether the target object and the vehicle intersect are predicted to intersect at the crossing based on the target object location data and the vehicle location data and respective routes of the target object and the vehicle. The method further includes, responsive to determining the target object and the vehicle are predicted to intersect at the crossing, identifying, by the processing device, another vehicle in the vicinity, wherein the other vehicle traverses a route that avoids the crossing.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
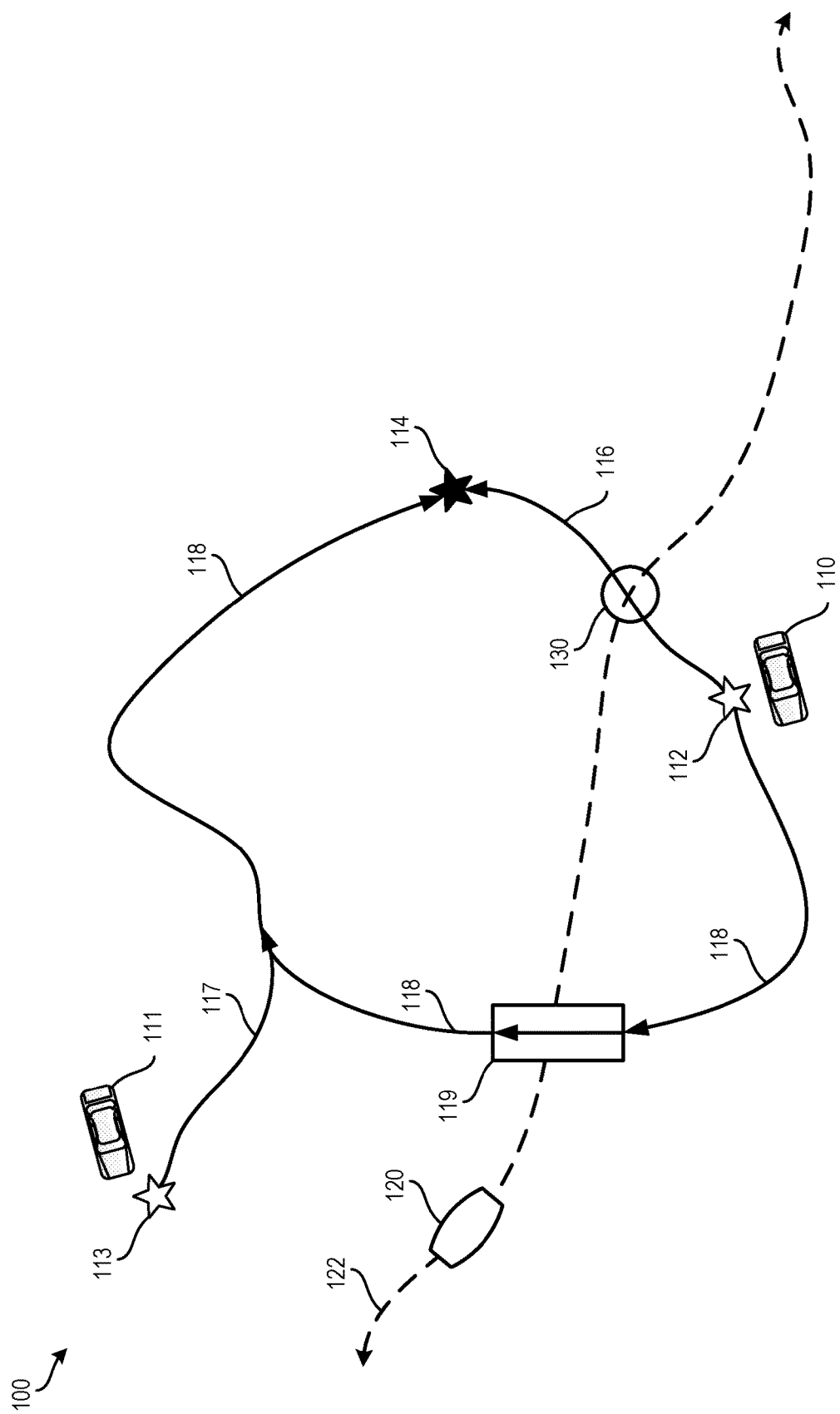
FIG. 1 depicts routes for a vehicle and an object according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide vehicle route optimization.

Roads that a vehicle traverses when traveling a route often cross other roads, train tracks, bodies of water, and the like. For example, a road, which is part of a route being traversed by a vehicle, may cross a railway line at an intersection. Such an intersection between a road and a railway line is referred to as a "level crossing." As used herein, the terms "crossing" or "level crossing" are used to describe a crossing between a road and another passageway, such as a railway line, the path of a ship along a body of water, and the like. As an example, when a train travels along the railway line through the crossing, the train blocks the road at the level crossing. This is referred to as a "closed crossing" and can inhibit the vehicle from traversing the level crossing.

A user may end up stuck waiting at a closed crossing because the user is unaware that the crossing is closed when the user arrives at the crossing. In such cases, the vehicle must wait until the train passes before the vehicle can continue along its route. Sometimes, level crossings are controlled by various traffic control devices, such as lights, audible alarms, and mechanical barriers to warn vehicles and/or prevent the vehicles from crossing the level crossing, such as when a train is or is about to be traversing the level crossing. Similarly, a draw bridge over a body of water can be raised when a ship/boat is passing through the level crossing, which can inhibit the vehicle from traversing the level crossing. Existing approaches to vehicle route planning do not adequately account for closed crossings by considering a route of the vehicle relative to a route of a target object.

The following aspects of the invention address the shortcomings of the prior art by identifying when a crossing is a closed crossing and providing vehicle route optimization to minimize any delay that might occur as a result of the closed crossing. For example, in the context of a single user, an alternate route may be determined when a crossing is determined to be a closed crossing along the user's intended route. As another example, in the context of a ride-sharing implementation, an alternate vehicle that may not be affected by the closed crossing can be dispatched to a pickup location associated with a user.

One or more embodiments of the present invention provide technological improvements over current methods of vehicle routing that do not consider closed crossings. Disadvantages of contemporary approaches may include selecting a route for a vehicle or selecting a rideshare vehicle to dispatch without considering whether a crossing will be closed upon arrival. One or more embodiments of the present invention provide technical solutions to one or more of these disadvantages of existing solutions by monitoring target objects that may pass through a crossing and cause the crossing to be closed upon a vehicle's arrival at the crossing.

Turning now to FIG. 1, a map 100 of a vehicle path 116 of a vehicle 110 crossing a target object path 122 of a target object 120 at a crossing 130 according to one or more embodiments described herein is depicted. In this example, the vehicle 110 is routed to travel along the vehicle path 116 between an origin 112 and a destination 114. As shown, the vehicle path 116 contains a crossing 130 with the target object path 122. When the target object, which can include a train, boat/ship, or another similar object, crosses through the crossing 130, the crossing cannot be traversed by vehicles or other objects, including the vehicle 110. Thus, when the target object crosses through the crossing 130, the crossing 130 is a closed crossing.

As further shown, the map 100 includes an alternate route 118 that includes an overpass (or underpass) 119 that crosses over (or under) the target object path 122 and thus avoids the crossing 130 and does not include another closed crossing. Accordingly, the vehicle 110 can traverse the vehicle path 118, including the overpass (or underpass) 119, and cross the target object path 122 regardless of where the target object 120 is along the target object path.

The present techniques of one or more embodiments identify when the crossing 130 will be closed so that a vehicle can be rerouted or that, in the case of ride-sharing, another vehicle 111 can be dispatched to the destination 114 along the vehicle paths 117, 118. For example, the other vehicle 111, at a location 113, is farther away from the destination 114 than the vehicle 111. However, if the crossing 130 is a closed crossing (meaning that the crossing 130 is closed when the vehicle 110 would anticipate intersecting the target object path 122), the other vehicle 111 can be dispatched to the destination 114 instead of the vehicle 111.

Figure 2:
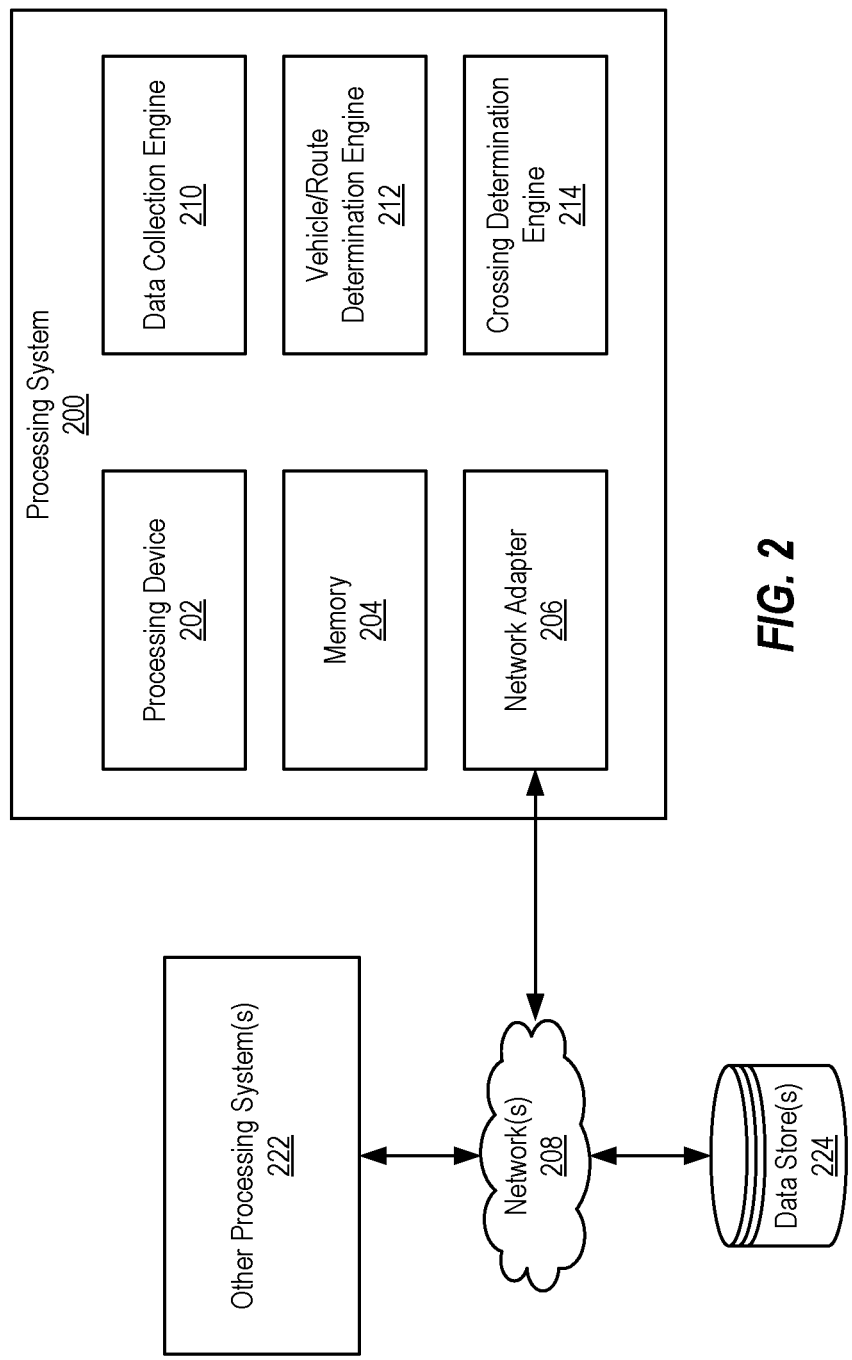
FIG. 2 depicts a block diagram of a processing system for vehicle route optimization according to one or more embodiments described herein.

FIG. 2 depicts a block diagram of a processing system 200 for vehicle route optimization according to one or more embodiments described herein. The processing system 200 includes a processing device 202 (e.g., one of the processors 921 of FIG. 9), a memory 204 (e.g., the RAM 924 of FIG. 9), and a network adapter 206 (e.g., the network adapter 926 of FIG. 9). Additionally, the processing system 200 includes a data collection engine 210, a vehicle/route determination engine 212, and a crossing determination engine 214. In accordance with one or more embodiments of described herein, the processing system 200 is an example of a cloud computing node 10 of FIG. 7.

The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus a system memory (e.g., memory 204) can store program instructions that when executed by the processing device 202 implement the engines described herein. Other engines can also be utilized to include other features and functionality described in other examples herein.

The network adapter 206 transmits data to and receives data from another processing system(s) 222, data store(s) 224, and the like either directly or via network(s) 208. The network(s) 208 represents any one or a combination of different types of suitable communications networks such as, for example, cable networks, public networks (e.g., the Internet), private networks, wireless networks, cellular networks, or any other suitable private and/or public networks. Further, the network(s) 208 may have any suitable communication range associated therewith and may include, for example, global networks (e.g., the Internet), metropolitan area networks (MANs), wide area networks (WANs), local area networks (LANs), or personal area networks (PANs). In addition, the network(s) 208 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The following depicts an example implementation for ride-sharing using the processing system 200 and its components. The data collection engine 210 receives a pickup notification for a user along with location information associated with the user. The vehicle/route determination engine 212 determines a shortest route the pickup location using global positioning system (GPS) navigation techniques. The crossing determination engine 214 determines whether the shortest route contains a level crossing or other similar crossing. If not, a ride-sharing vehicle is deployed along the shortest route. However, if a level crossing is determined to exist, it is determined whether the closing will be closed. If not, the ride-sharing vehicle is deployed along the shortest route. However, if the crossing will be closed, the ride-sharing vehicle can be deployed on an alternate route that does not intersect the closed crossing, an alternate ride-sharing vehicle can be deployed that does not intersect the closed crossing or the like.

Figure 3:
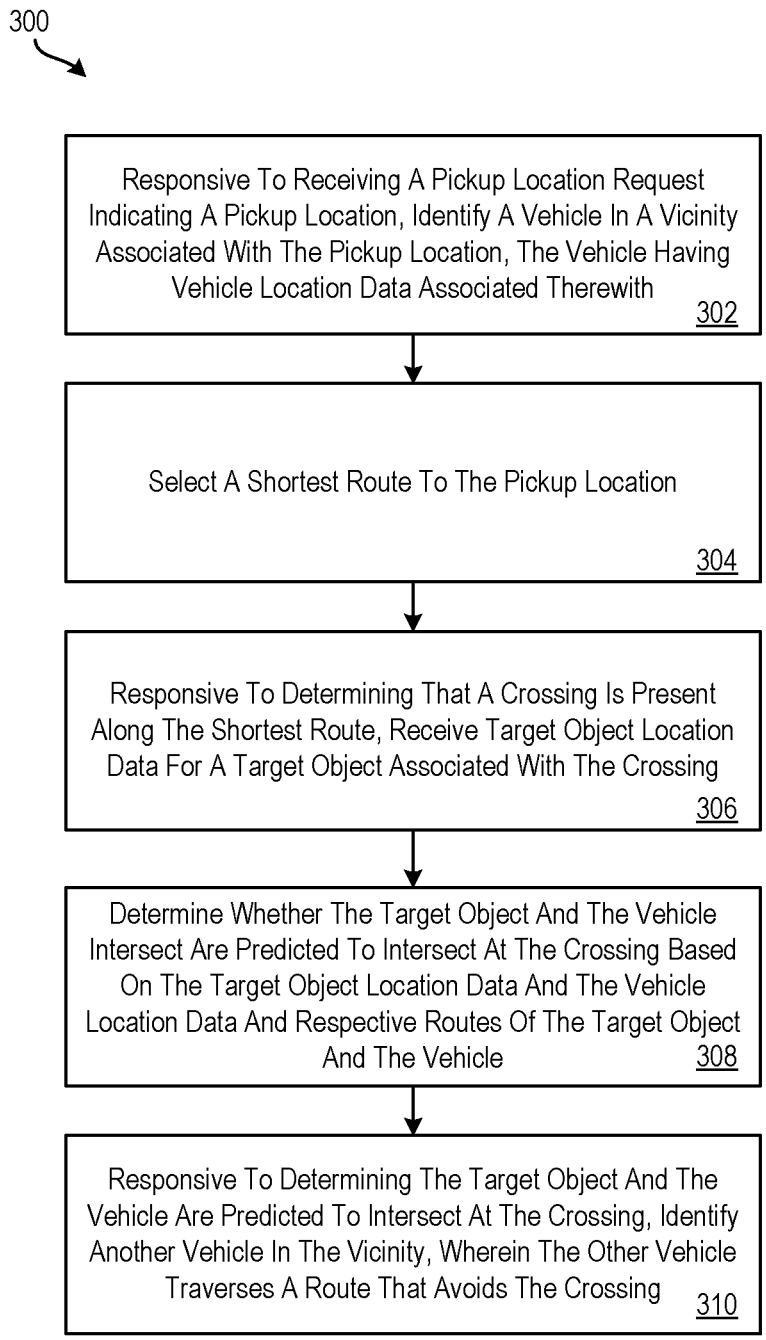
FIG. 3 depicts a flow diagram of a method for vehicle route optimization according to one or more embodiments described herein.

FIG. 3 depicts a flow diagram of a method 300 for vehicle route optimization according to examples of the present disclosure. The method 300 can be performed by any suitable processing system (e.g., the processing system 200 of FIG. 2, the processing system 900 of FIG. 9, the cloud computing node 10 of FIG. 7, etc.), any suitable processing device (e.g., the processing device 202 of FIG. 2, one of the processors 921 of FIG. 9, etc.), and/or combinations thereof and the like. The blocks of the method 300 are now described with reference to the components of the processing system 200 of FIG. 2.

At block 302, the vehicle/route determination engine 212 identifies a vehicle (e.g., the vehicle 110) in a vicinity associated with the pickup location responsive to receiving a pickup location request indicating the pickup location. For example, multiple vehicles (e.g., the vehicles 110, 111) are available for rideshare pick up, and the vehicle/route determination engine 212 identifies the vehicle 110 to perform the pickup. This determination can be, for example, based on the vehicle 110 being the closest to the pickup location (e.g., the destination 114), being estimated to take the least amount of time to travel to the pickup location, or based on another consideration. The vehicle has vehicle location data associated therewith. The vehicle location data can include GPS coordinates, for example, as well as speed and direction of movement data.

At block 304, the vehicle/route determination engine 212 selects a shortest route (e.g., the vehicle path 116) to the pickup location (e.g., the destination 114). The shortest route can be selected based on distance, time, or other considerations.

At block 306, the data collection engine 210 receives target object location data for a target object (e.g., the target object 120) responsive to determining that a crossing (e.g., the crossing 130) is present along the shortest route. The target object location data can include GPS coordinates, for example, as well as speed and direction of movement data.

At block 308, the crossing determination engine 214 determines whether the target object and the vehicle are predicted to intersect at the crossing based on the target object location data and the vehicle location data and respective routes of the target object and the vehicle. According to an example, this determination is made by determining a target object crossing window and a vehicle crossing window. The target object crossing window is determined by: determining a first distance to the crossing of the target object based at least in part on the target object location data; calculating a first nominal time to the crossing for the target object; and determining the target object crossing window by applying a first tolerance to the first nominal time. The vehicle crossing window is determined by determining a second distance to the crossing of the vehicle based at least in part on the vehicle location data; calculating a second nominal time to the crossing for the vehicle based on the second distance; and determining the vehicle crossing window by applying a second tolerance to the nominal time. The target object and the vehicle are determined to intersect at the crossing when at least a portion of the target object crossing window overlaps with the vehicle crossing window. However, the target object and the vehicle are determined not to intersect at the crossing when the target object crossing window is distinct from the vehicle crossing window.

At block 312, responsive to determining the target object and the vehicle are predicted to intersect at the crossing, the vehicle/route determination engine 212 can identify another vehicle in the vicinity to dispatch to the pickup location. The other vehicle (e.g., the vehicle 111) traverses or travels along a route (e.g., the vehicle paths 117, 118) that avoids the crossing.

Additional processes also may be included, and it should be understood that the process depicted in FIG. 3 represents an illustration, and that other processes may be added or existing processes may be removed, modified, or rearranged without departing from the scope of the present disclosure.

Figure 4:
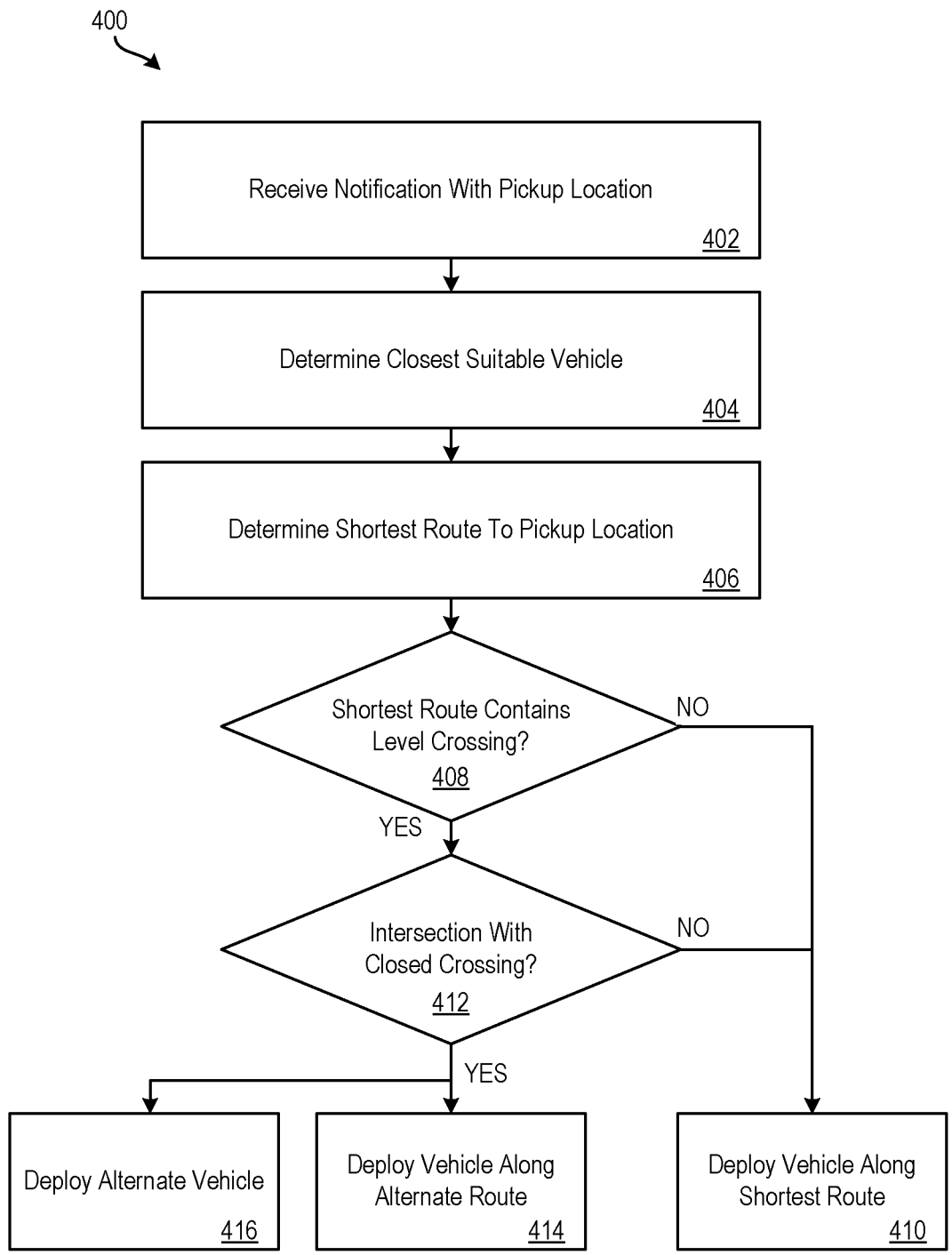
FIG. 4 depicts a flow diagram of a method for vehicle route optimization according to one or more embodiments described herein.

FIG. 4 depicts a flow diagram of a method 400 for vehicle route optimization according to examples of the present disclosure. The method 400 can be performed by any suitable processing system (e.g., the processing system 200 of FIG. 2, the processing system 900 of FIG. 9, the cloud computing node 10 of FIG. 7, etc.), any suitable processing device (e.g., the processing device 202 of FIG. 2, one of the processors 921 of FIG. 9, etc.), and/or combinations thereof and the like. The blocks of the method 400 are now described with reference to the components of the processing system 200 of FIG. 2.

At block 402, the data collection engine 210 receives a notification for a pickup location. For example, a user can use a ridesharing application to request a pickup and designate an associated pickup location.

At block 404, the vehicle/route determination engine 212 determines a closest suitable vehicle (e.g., the vehicle 110 or another suitable vehicle). This can be determined, for example, by comparing a location of the user requesting the pickup to locations of vehicles and selecting a closest vehicle. The closest vehicle can be the closest by distance, the closest by travel time, or some other measure. The location of the user and/or the location of the vehicles can be determined based on global positioning system (GPS) data or other suitable location-based data.

At block 406, the vehicle/route determination engine 212 determines a shortest route to the pickup location. According to an example, the shortest route is determined from various routes by comparing travel time among the various routes, with the shortest travel time being determined to be the shortest route. According to another example, the shortest route is determined from various routes by comparing travel distance among the various routes, with the shortest travel distance being determined to be the shortest route.

At decision block 408, the crossing determination engine 214 determines whether the shortest route (determined at block 406) contains a level crossing. If not, the method 400 proceeds to block 410 and the closest suitable vehicle (determined at block 404) is dispatched to travel along the shortest route (determined at block 406) to pick up the user. However, if at decision block 408 it is determined that the shortest route contains a level crossing, the method proceeds to decision block 412.

At decision block 412, the crossing determination engine 214 determines whether the vehicle will intersect the level crossing when the level crossing is closed. In this example, closed in the context of a level crossing indicates that the level crossing is closed to cross-traffic, such as the vehicle, because the level crossing is or is about to be traversed by an object, such as a train. This determination at block 412 is further described herein with reference to FIG. 5. If it is determined at decision block 412 that the vehicle will not intersect the level crossing when the level crossing is closed, the method 400 proceeds to block 410 and the closest suitable vehicle (determined at block 404) is dispatched to travel along the shortest route (determined at block 406) to pick up the user. However in an example, if at decision block 412 it is determined that the vehicle will intersect the level crossing when the level crossing is closed, the vehicle is deployed along an alternate route at block 414. In another example, if at decision block 412 it is determined that the vehicle will intersect the level crossing when the level crossing is closed, another vehicle is deployed at block 416. In such examples, the other vehicle may be dispatched along a route that does not cross the level crossing or at least does not cross the level crossing when the level crossing is closed.

Additional processes also may be included, and it should be understood that the process depicted in FIG. 4 represents an illustration, and that other processes may be added or existing processes may be removed, modified, or rearranged without departing from the scope of the present disclosure.

Figure 5:
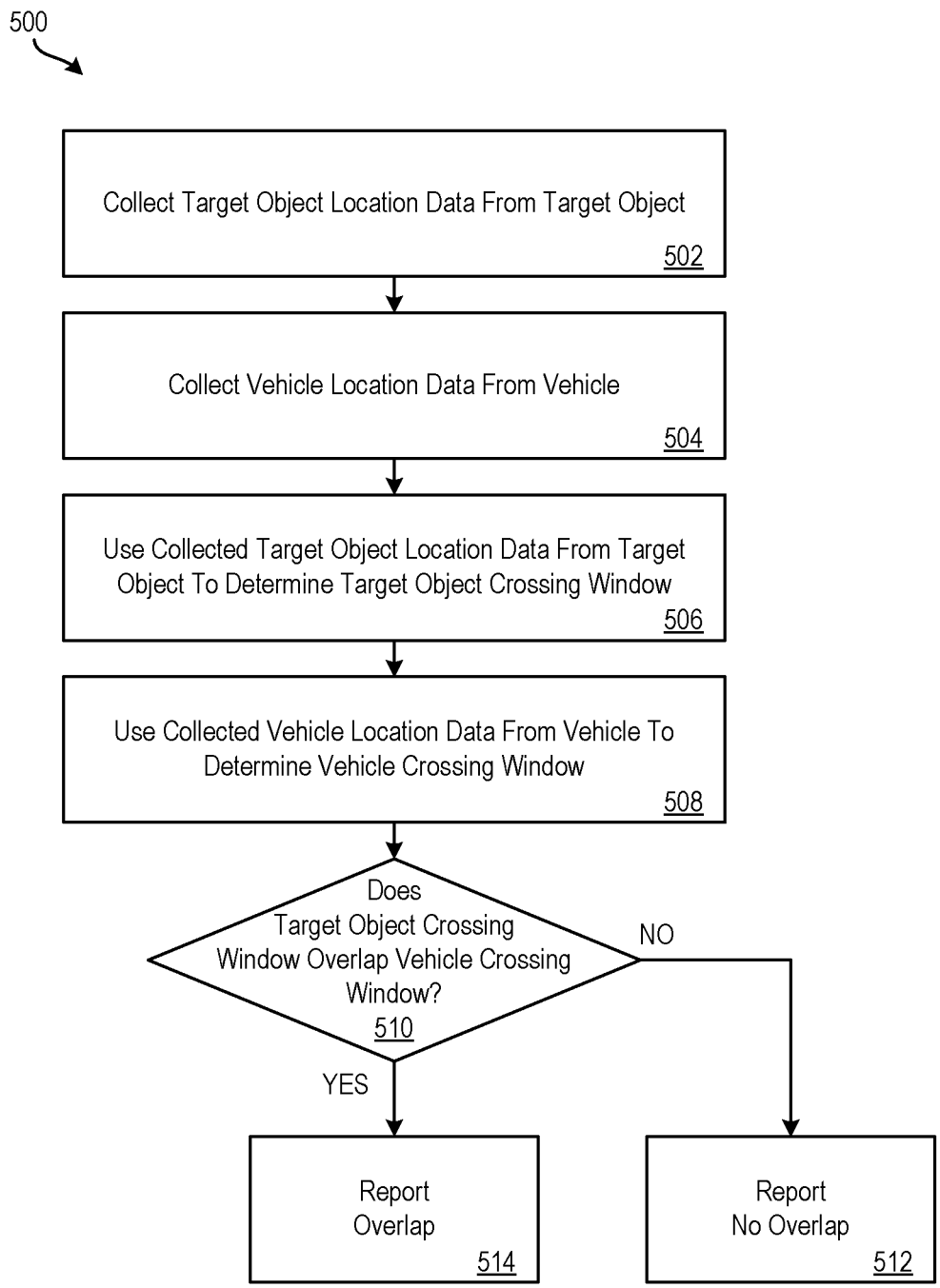
FIG. 5 depicts a flow diagram of a method for intersection determination for vehicle route optimization according to one or more embodiments described herein.

FIG. 5 depicts a flow diagram of a method 500 for vehicle route optimization according to examples of the present disclosure. The method 500 can be performed by any suitable processing system (e.g., the processing system 200 of FIG. 2, the processing system 900 of FIG. 9, the cloud computing node 10 of FIG. 7, etc.), any suitable processing device (e.g., the processing device 202 of FIG. 2, one of the processors 921 of FIG. 9, etc.), and/or combinations thereof and the like. The blocks of the method 500 are now described with reference to the components of the processing system 200 of FIG. 2.

At block 502, the data collection engine 210 collects target object location data from the target object (e.g., the target object 120, which can be, for example, a train, boat/ship, etc.). The target object location data can include position and speed data and can be collected using GPS techniques.

At block 504, the data collection engine 210 collects vehicle location data from the vehicle (e.g., the vehicle 110). The vehicle location data can include position and speed data and can be collected using GPS techniques.

At block 506, the crossing determination engine 214 uses the collected target object location data from the target object to determine a target object crossing window. The target object crossing window is a time (or window/range of time) that a target object is anticipated to be at the crossing. At block 508, the crossing determination engine 214 uses the collected vehicle location data from the vehicle to determine a vehicle crossing window. The vehicle crossing window is a time (or window/range of time) that the vehicle is anticipated to be at the crossing. The determinations of the target object crossing window at block 504 and of the vehicle crossing window at block 506 are further described herein with reference to FIG. 6.

At decision block 510, the crossing determination engine 214 determines whether the target object crossing window overlaps with the vehicle crossing window 510. For example, the crossing determination engine 214 compares the target object crossing window to the vehicle crossing window to determine if the windows overlap. As an example, if the target object crossing window is 10:41 am-10:59 am and the vehicle crossing window is 10:50 am-10:52 am, the crossing determination engine 214 determines that an overlap exists. As another example, if the target object crossing window is 10:41 am-10:59 am and the vehicle crossing window is 10:40 am-10:43 am, the crossing determination engine 214 determines that an overlap exists. Similarly, as another example, if the target object crossing window is 10:41 am-10:59 am and the vehicle crossing window is 10:57 am-11:02 am, the crossing determination engine 214 determines that an overlap exists. If, however, as another example, the target object crossing window is 10:41 am-10:59 am and the vehicle crossing window is 11:00 am-11:02 am, the crossing determination engine 214 determines that no overlap exists.

If at decision block 510 it is determined that no overlap exists, the method 500 continues to block 512, and the crossing determination engine 214 reports that no overlap exists. However, if at decision block 510 it is determined that an overlap exists, the method 500 continues to block 514, and the crossing determination engine 214 reports that an overlap exists. In some examples, if it is determined that an overlap exists at decision block 510, it can be determined whether the vehicle the delay is long enough to warrant taking an alternate route, which may be longer. For example, if the delay is less than the amount of time taking the alternate route would require, it may be determined that the vehicle should wait at the crossing instead of taking the alternate route. If, however, the delay is longer than the amount of time taking the alternate route would require, it may be determined that the vehicle should take the alternate rout instead of waiting at the crossing.

Additional processes also may be included, and it should be understood that the process depicted in FIG. 5 represents an illustration, and that other processes may be added or existing processes may be removed, modified, or rearranged without departing from the scope of the present disclosure.

Figure 6:
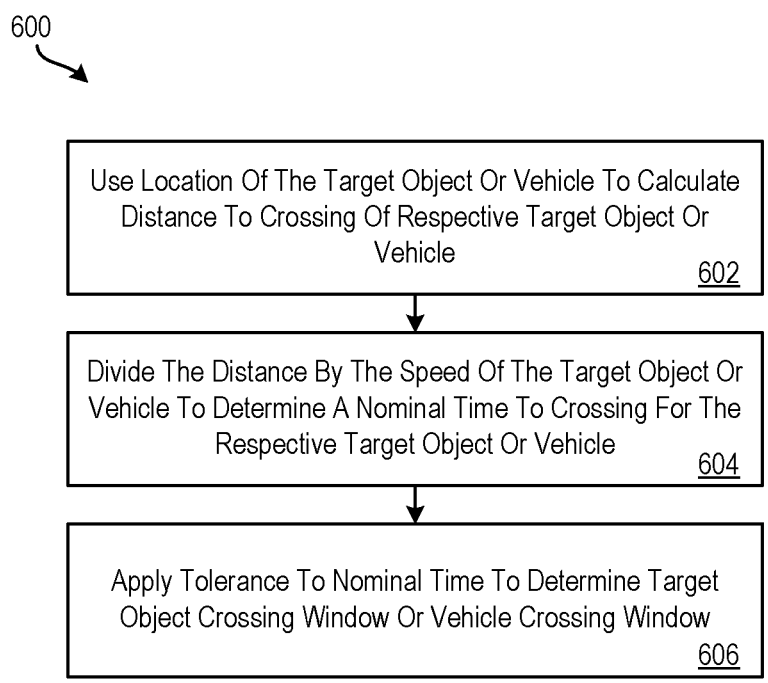
FIG. 6 depicts a flow diagram of a method for crossing window determination for vehicle route optimization according to one or more embodiments described herein.

FIG. 6 depicts a flow diagram of a method 600 for intersection determination for vehicle route optimization according to one or more embodiments described herein. The method 600 can be performed by any suitable processing system (e.g., the processing system 200 of FIG. 2, the processing system 900 of FIG. 9, the cloud computing node 10 of FIG. 7, etc.), any suitable processing device (e.g., the processing device 202 of FIG. 2, one of the processors 921 of FIG. 9, etc.), and/or combinations thereof and the like. The blocks of the method 600 are now described with reference to the components of the processing system 200 of FIG. 2.

At block 602, the crossing determination engine 214 uses the location of the target object or the location of the vehicle to calculate a distance from the respective target object or vehicle to the crossing.

At block 604, the crossing determination engine 214 divides the calculated distance for the respective target object or vehicle by the speed of the respective target object or vehicle to determine a nominal time to crossing of the target object or vehicle.

At block 606, the crossing determination engine 214 applies a tolerance to the nominal value to determine the window crossing for the respective target object (e.g., the target object crossing window) or vehicle (e.g., the vehicle crossing window). The tolerance is applied to account for variations and uncertainties, such as a length of the target object (e.g., a train), traffic conditions, weather conditions, changes to the speed of the target object or vehicle, etc.

Additional processes also may be included, and it should be understood that the process depicted in FIG. 6 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
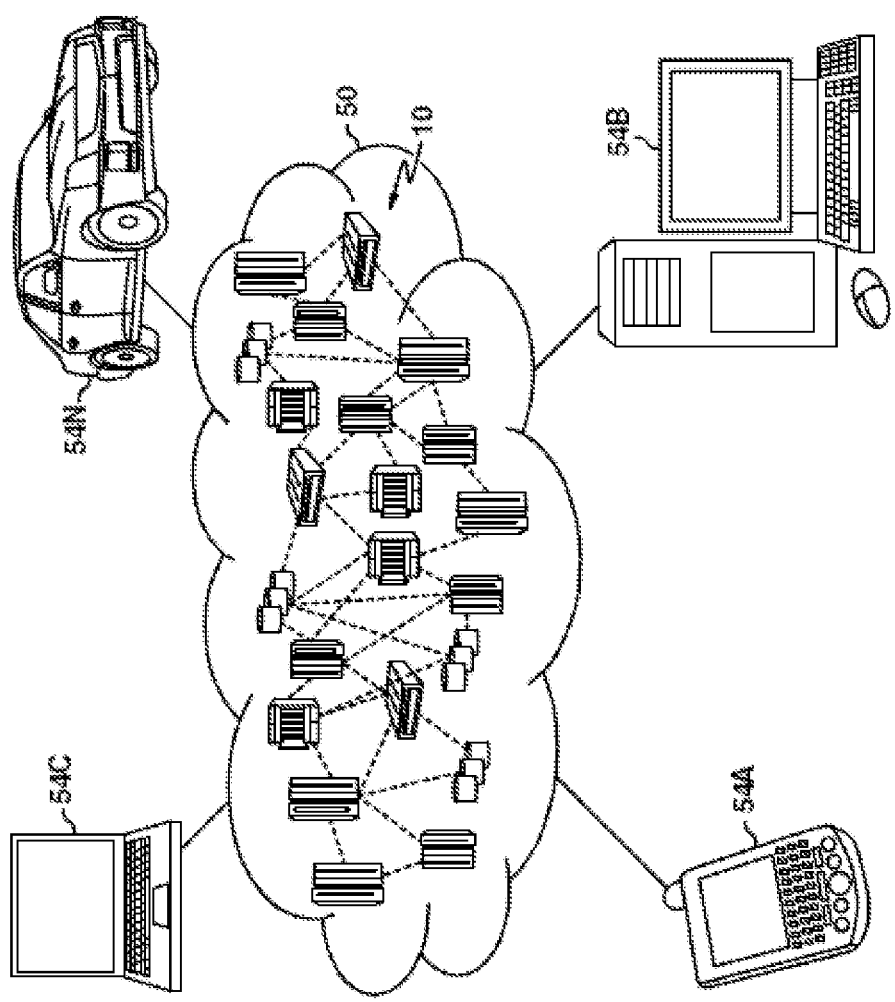
FIG. 7 depicts a cloud computing environment according to one or more embodiments described herein.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
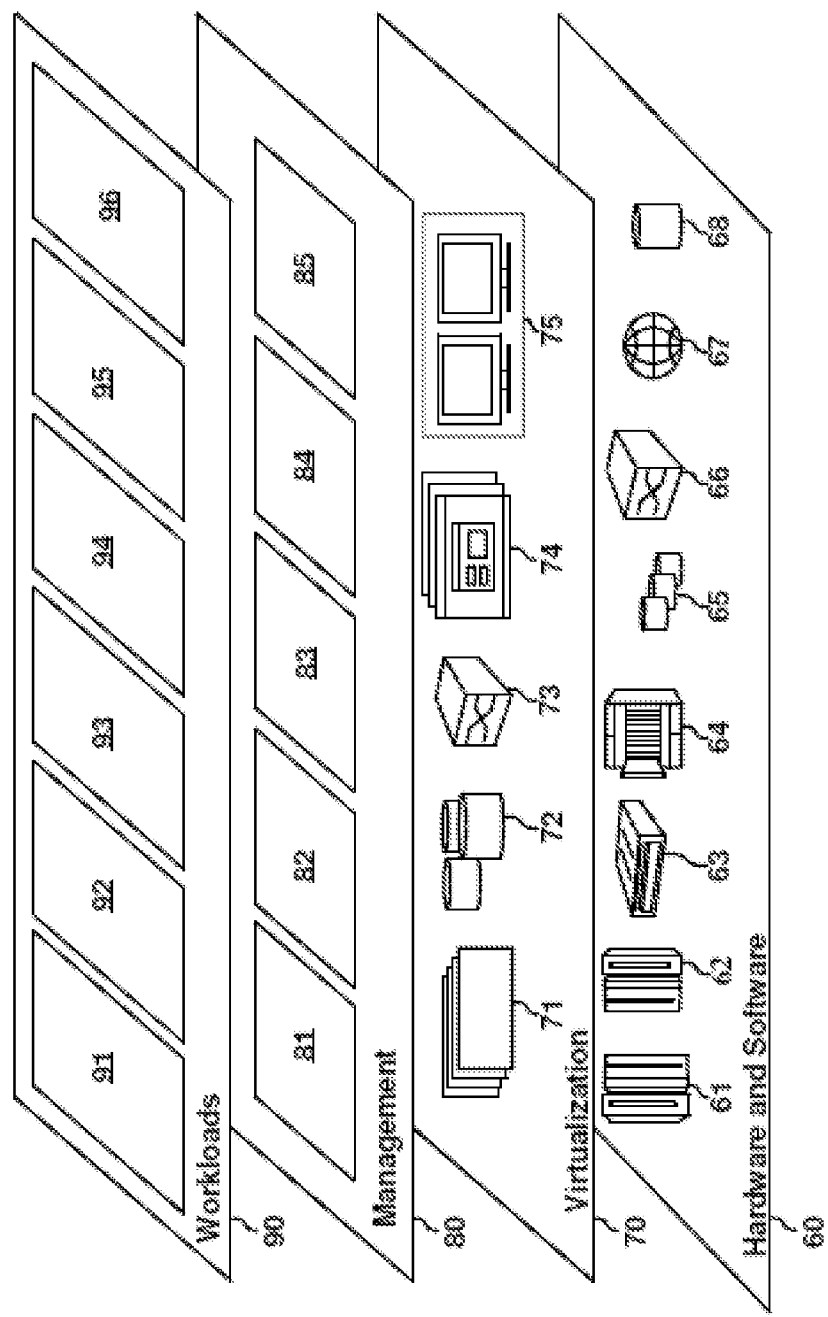
FIG. 8 depicts abstraction model layers according to one or more embodiments described herein.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle route optimization 96.

Figure 9:
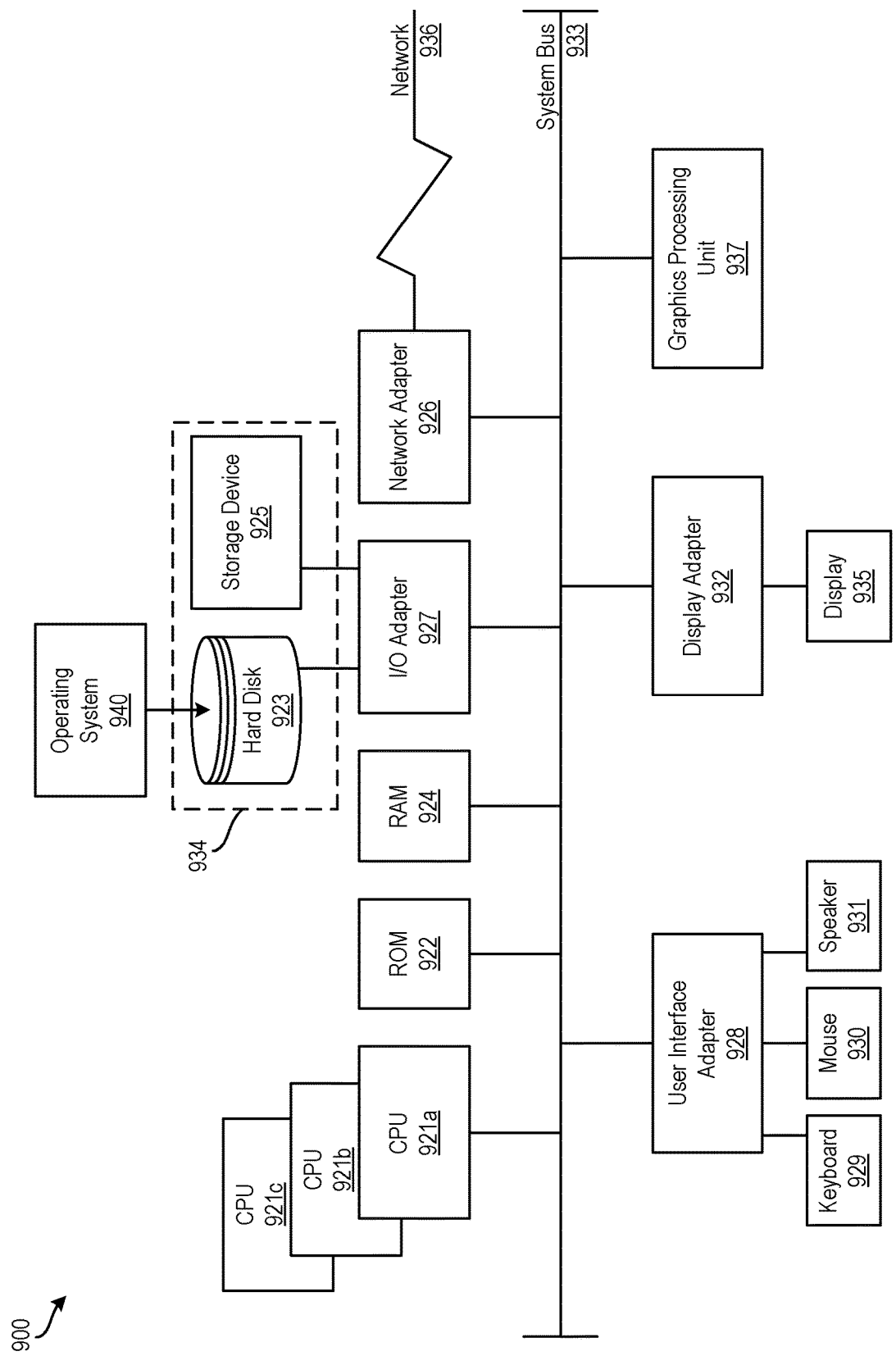
FIG. 9 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 9 depicts a block diagram of a processing system 900 for implementing the techniques described herein. In accordance with one or more embodiments of the present invention, system 900 is an example of a cloud computing node 10 of FIG. 7 In examples, processing system 900 has one or more central processing units ("processors" or "processing resources") 921a, 921b, 921c, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display (e.g., a display monitor) 935 is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for vehicle route optimization, the method comprising:
responsive to receiving a pickup location request indicating a pickup location, identifying, by a processing device, a vehicle in a vicinity associated with the pickup location, the vehicle having vehicle location data associated therewith;
selecting a shortest route from the vehicle to the pickup location;
responsive to determining that a crossing is present along the shortest route, receiving target object location data for a target object associated with the crossing;
determining, by the processing device, whether the target object and the vehicle are predicted to intersect at the crossing based on the target object location data and the vehicle location data and respective routes of the target object and the vehicle, wherein determining whether the target object and the vehicle are predicted to intersect at the crossing further comprises:
determining a target object crossing window by applying a first tolerance to a first nominal time to the crossing for the target object based on a first distance, wherein the target object crossing window is a window of time that the target object is predicted to be at the crossing; and
determining a vehicle crossing window by applying a second tolerance to the nominal time to the crossing for the vehicle based on a second distance, wherein the vehicle crossing window is a window of time that the vehicle is predicted to be at the crossing,
wherein the first tolerance differs from the second tolerance, wherein at least one of the first tolerance or the second tolerance is selected based at least in part on a length of the target object, traffic conditions, and weather conditions;
responsive to determining the target object and the vehicle are predicted to intersect at the crossing, identifying, by the processing device, another vehicle in the vicinity, wherein the other vehicle traverses a route that avoids the crossing; and
dispatching the other vehicle in the vicinity to the pickup location, wherein the vehicle is a first vehicle selected from a pool of ride-sharing vehicles, and wherein the other vehicle is a second vehicle selected from the pool of ride-sharing vehicles.

2. The computer-implemented method of claim 1, wherein the target object is a train or boat.

3. The computer-implemented method of claim 1, wherein the target object location data and the vehicle location data are global positioning system data.

4. The computer-implemented method of claim 1, wherein determining whether the target object and the vehicle are predicted to intersect at the crossing further comprises:
determining the first distance to the crossing of the target object based at least in part on the target object location data; and
calculating the first nominal time to the crossing for the target object.

5. The computer-implemented method of claim 4, wherein determining whether the target object and the vehicle are predicted to intersect at the crossing further comprises:
determining the second distance to the crossing of the vehicle based at least in part on the vehicle location data; and
calculating the second nominal time to the crossing for the vehicle based on the second distance.

6. The computer-implemented method of claim 5, wherein the target object and the vehicle are determined to intersect at the crossing when at least a portion of the target object crossing window overlaps with the vehicle crossing window.

7. The computer-implemented method of claim 5, wherein the target object and the vehicle are determined not to intersect at the crossing when the target object crossing window is distinct from the vehicle crossing window.

8. A system comprising:
a memory comprising computer readable instructions; and
a processing device for executing the computer readable instructions, the computer readable instructions controlling the processing device to perform operations comprising:
responsive to receiving a pickup location request indicating a pickup location, identifying, by the processing device, a vehicle in a vicinity associated with the pickup location, the vehicle having vehicle location data associated therewith;
selecting a shortest route from the vehicle to the pickup location;
responsive to determining that a crossing is present along the shortest route, receiving target object location data for a target object associated with the crossing;
determining, by the processing device, whether the target object and the vehicle are predicted to intersect at the crossing based on the target object location data and the vehicle location data and respective routes of the target object and the vehicle, wherein determining whether the target object and the vehicle are predicted to intersect at the crossing further comprises:
determining a target object crossing window by applying a first tolerance to a first nominal time to the crossing for the target object based on a first distance, wherein the target object crossing window is a window of time that the target object is predicted to be at the crossing; and
determining a vehicle crossing window by applying a second tolerance to the nominal time to the crossing for the vehicle based on a second distance, wherein the vehicle crossing window is a window of time that the vehicle is predicted to be at the crossing,
wherein the first tolerance differs from the second tolerance, wherein at least one of the first tolerance or the second tolerance is selected based at least in part on a length of the target object, traffic conditions, and weather conditions;
responsive to determining the target object and the vehicle are predicted to intersect at the crossing, identifying, by the processing device, another vehicle in the vicinity, wherein the other vehicle traverses a route that avoids the crossing; and dispatching the other vehicle in the vicinity to the pickup location, wherein the vehicle is a first vehicle selected from a pool of ride-sharing vehicles, and wherein the other vehicle is a second vehicle selected from the pool of ride-sharing vehicles.

9. The system of claim 8, wherein the target object is a train or boat.

10. The system of claim 8, wherein the target object location data and the vehicle location data are global positioning system data.

11. The system of claim 8, wherein determining whether the target object and the vehicle are predicted to intersect at the crossing further comprises:

determining the first distance to the crossing of the target object based at least in part on the target object location data; and calculating the first nominal time to the crossing for the target object.

12. The system of claim 11, wherein determining whether the target object and the vehicle are predicted to intersect at the crossing further comprises:

determining the second distance to the crossing of the vehicle based at least in part on the vehicle location data; and calculating the second nominal time to the crossing for the vehicle based on the second distance.

13. The system of claim 12, wherein the target object and the vehicle are determined to intersect at the crossing when at least a portion of the target object crossing window overlaps with the vehicle crossing window.

14. The system of claim 13, wherein the target object and the vehicle are determined not to intersect at the crossing when the target object crossing window is distinct from the vehicle crossing window.

15. A computer program product comprising a computer readable storage medium having program instructions embodied therewith, the program instructions executable by a processor to cause the processor to perform operations comprising:

responsive to receiving a pickup location request indicating a pickup location, identifying, by the processing device, a vehicle in a vicinity associated with the pickup location, the vehicle having vehicle location data associated therewith;

selecting a shortest route from the vehicle to the pickup location;

responsive to determining that a crossing is present along the shortest route, receiving target object location data for a target object associated with the crossing;

determining, by the processing device, whether the target object and the vehicle are predicted to intersect at the crossing based on the target object location data and the vehicle location data and respective routes of the target object and the vehicle, wherein determining whether the target object and the vehicle are predicted to intersect at the crossing further comprises:

determining a target object crossing window by applying a first tolerance to a first nominal time to the crossing for the target object based on a first distance, wherein the target object crossing window is a window of time that the target object is predicted to be at the crossing; and determining a vehicle crossing window by applying a second tolerance to the nominal time to the crossing for the vehicle based on a second distance, wherein the vehicle crossing window is a window of time that the vehicle is predicted to be at the crossing, wherein the first tolerance differs from the second tolerance, wherein at least one of the first tolerance or the second tolerance is selected based at least in part on a length of the target object, traffic conditions, and weather conditions;

responsive to determining the target object and the vehicle are predicted to intersect at the crossing, identifying, by the processing device, another vehicle in the vicinity, wherein the other vehicle traverses a route that avoids the crossing; and dispatching the other vehicle in the vicinity to the pickup location, wherein the vehicle is a first vehicle selected from a pool of ride-sharing vehicles, and wherein the other vehicle is a second vehicle selected from the pool of ride-sharing vehicles.

16. The computer program product of claim 15, wherein determining whether the target object and the are predicted to vehicle intersect at the crossing further comprises:

determining the first distance to the crossing of the target object based at least in part on the target object location data; and calculating the first nominal time to the crossing for the target object.

17. The computer program product of claim 16, wherein determining whether the target object and the vehicle are predicted to intersect at the crossing further comprises:

determining the second distance to the crossing of the vehicle based at least in part on the vehicle location data; and calculating the second nominal time to the crossing for the vehicle based on the second distance.

18. The computer program product of claim 17, wherein the target object and the vehicle are determined to intersect at the crossing when at least a portion of the target object crossing window overlaps with the vehicle crossing window.

* * * * *